(12) United States Patent
Tripathy et al.

(10) Patent No.: US 8,938,639 B1
(45) Date of Patent: Jan. 20, 2015

(54) SYSTEMS AND METHODS FOR PERFORMING FAST FAILOVERS

(75) Inventors: Soumya Tripathy, West Bengal (IN); Mahendra Karmuse, Maharashtra (IN); Selvaraj M, Andhra Pradesh (IN)

(73) Assignee: Symantec Corporation, Mountain View, CA (US)

( * ) Notice: Subject to any disclaimer, the term of this patent is extended or adjusted under 35 U.S.C. 154(b) by 330 days.

(21) Appl. No.: 13/404,998

(22) Filed: Feb. 24, 2012

(51) Int. Cl.
*G06F 11/00* (2006.01)

(52) U.S. Cl.
USPC ............................................ 714/4.11

(58) Field of Classification Search
CPC ............ G06F 11/2023; G06F 11/2025; G06F 11/2028; G06F 11/203
USPC .................................................. 714/4.11, 13
See application file for complete search history.

(56) References Cited

U.S. PATENT DOCUMENTS

| 7,480,814 | B2 * | 1/2009 | Shinohara et al. | 714/4.1 |
| 8,074,099 | B2 * | 12/2011 | Arata et al. | 714/4.12 |
| 8,621,260 | B1 * | 12/2013 | Sontakke et al. | 714/4.11 |
| 2001/0008019 | A1 * | 7/2001 | Vert et al. | 714/1 |
| 2003/0051187 | A1 * | 3/2003 | Mashayekhi et al. | 714/4 |
| 2004/0083404 | A1 * | 4/2004 | Subramaniam et al. | 714/13 |
| 2006/0085695 | A1 * | 4/2006 | Shrivastava et al. | 714/47 |
| 2007/0011164 | A1 * | 1/2007 | Matsubara et al. | 707/8 |
| 2008/0270820 | A1 * | 10/2008 | Kondo et al. | 714/2 |
| 2012/0030503 | A1 * | 2/2012 | Li et al. | 714/4.11 |
| 2012/0042069 | A1 * | 2/2012 | Hatasaki et al. | 709/224 |

* cited by examiner

*Primary Examiner* — Joshua Lohn
(74) *Attorney, Agent, or Firm* — ALG Intellectual Property, LLC

(57) ABSTRACT

A computer-implemented method for performing fast failovers may include 1) identifying an application to fail over from a first computing system to a second computing system, 2) identifying a first component of the application to fail over, the first component depending on a second component of the application and a third component of the application, the second component and third component being mutually independent, and 3) failing the application over from the first computing system to the second computing system by, based on a determination that the second component and third component are mutually independent, (i) taking the second component offline on the first computing system after taking the first component offline on the first computing system and (ii) taking the third component offline on the first computing system while bringing the second component online on the second computing system. Various other methods, systems, and computer-readable media are also disclosed.

20 Claims, 6 Drawing Sheets

_US 8,938,639 B1_

SYSTEMS AND METHODS FOR PERFORMING FAST FAILOVERS

BACKGROUND

Business continuity and disaster recovery refers to the capability to restore normal (or near-normal) business operations, from a critical business application perspective, after the occurrence of a disaster that interrupts business operations. Business continuity and disaster recovery may require the ability to bring up mission-critical applications and the data these applications depend on and make them available to users as quickly as business requirements dictate. In cases where downtime is costly, the process may involve automation. For mission-critical applications that demand minimal downtime, the disaster recovery process may need to be highly automated and resilient. Clustering technologies may provide such highly automated and resilient disaster recovery.

Clusters may include multiple systems connected in various combinations to shared storage devices. Cluster server software may monitor and control applications running in the cluster and may restart applications in response to a variety of hardware or software faults. For failover service groups running in traditional clusters, the time to failover includes the time needed to take offline all the resources of the service group from the failed node plus the time needed to bring online all the resources of the service group on the failover node. Unfortunately, the time required to take a service group completely offline and then bring the service group back online may result in failure to comply with a service level agreement. Accordingly, the instant disclosure identifies and addresses a need for additional and improved systems and methods for performing failovers.

SUMMARY

As will be described in greater detail below, the instant disclosure generally relates to systems and methods for performing fast failovers by bringing components of an application back online on a target system during and/or before taking all independent components of the application offline on a failed system. In one example, a computer-implemented method for performing fast failovers may include 1) identifying an application to fail over from a first computing system to a second computing system, 2) identifying a first component of the application to fail over, the first component depending on a second component of the application and a third component of the application, the second component and third component being mutually independent, and 3) failing the application over from the first computing system to the second computing system by, based on a determination that the second component and third component are mutually independent, (i) taking the second component offline on the first computing system after taking the first component offline on the first computing system and (ii) taking the third component offline on the first computing system while bringing the second component online on the second computing system.

In some examples, identifying the first component may include identifying a first dependency relationship between the first component and the second component and identifying a second dependency relationship between the first component and the third component. In some embodiments, identifying the first component may include identifying a plurality of components of the application. In these embodiments, identifying the plurality of components may include identifying a dependency graph describing dependencies between the plurality of components. The plurality of components may include any of a variety of components, including an operating system component, a process, a network resource, and/or a storage resource.

In one example, taking the third component offline may include starting the bring the second component online on the second computing system before starting to take the third component offline on the first computing system.

In some examples, the computer-implemented method may also include 1) taking the first component offline on the first computing system before taking the second component offline on the first computing system and 2) bringing the first component online on the second computing system after bringing the third component online on the second computing system.

In some embodiments, the second component may include a plurality of subcomponents. In these embodiments, taking the third component offline may include taking the third component offline on the first computing system while bringing at least one component within the plurality of subcomponents online on the second computing system. Likewise, in some examples, the third component may include a plurality of subcomponents. In these examples, taking the third component offline may include taking at least one component within the plurality of subcomponents offline while bringing the second component online on the second computing system.

In one embodiment, a system for implementing the above-described method may include 1) an identification module programmed to identify an application to fail over from a first computing system to a second computing system, 2) a dependency module programmed to identify a first component of the application to fail over, the first component depending on a second component of the application and a third component of the application, the second component and third component being mutually independent, and 3) a failover module programmed to fail the application over from the first computing system to the second computing system by, based on a determination that the second component and third component are mutually independent, (i) taking the second component offline on the first computing system after taking the first component offline on the first computing system and (ii) taking the third component offline on the first computing system while bringing the second component online on the second computing system. The system may also include at least one processor configured to execute the identification module, the dependency module, and the failover module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an application to fail over from a first computing system to a second computing system, 2) identify a first component of the application to fail over, the first component depending on a second component of the application and a third component of the application, the second component and third component being mutually independent, and 3) fail the application over from the first computing system to the second computing system by, based on a determination that the second component and third component are mutually independent, (i) taking the second component offline on the first computing system after taking the first component offline on the first computing system and (ii)

taking the third component offline on the first computing system while bringing the second component online on the second computing system.

As will be explained in greater detail below, by bringing components of an application back online on a target system during and/or before taking all independent components of the application offline on a failed system, the systems and methods described herein may facilitate faster failovers of applications and, thereby, potentially reduce application downtime after failure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
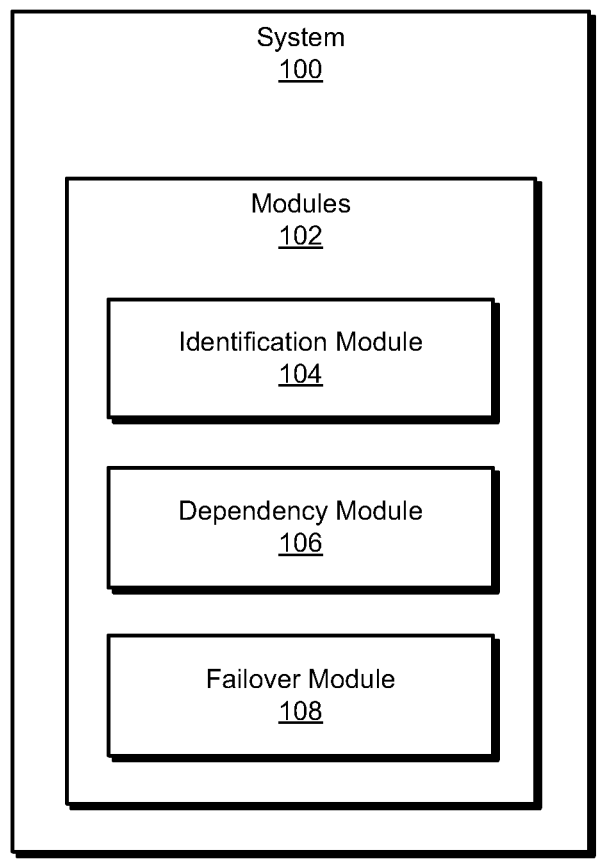
FIG. 1 is a block diagram of an exemplary system for performing fast failovers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
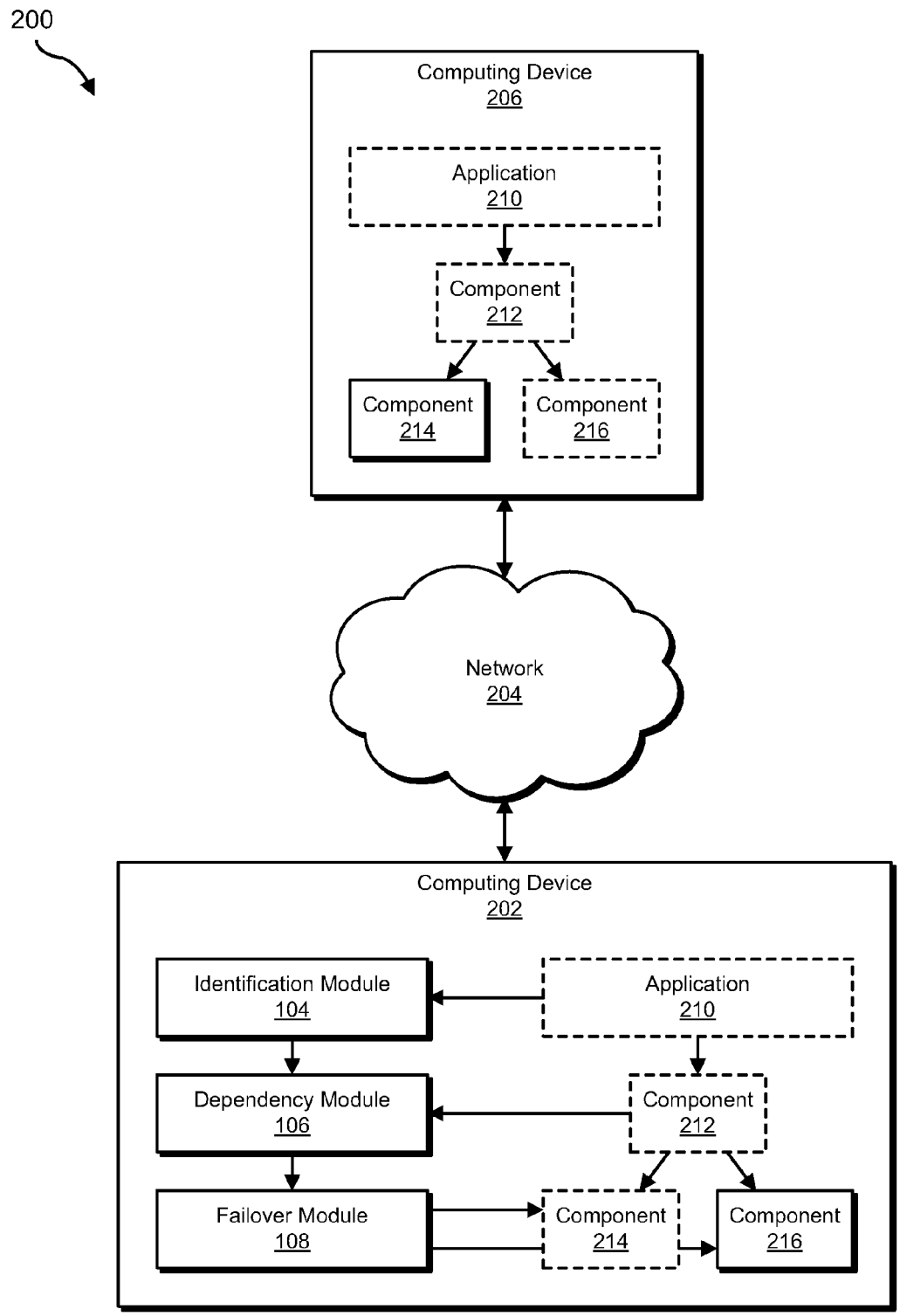
FIG. 2 is a block diagram of an exemplary system for performing fast failovers.

The following will provide, with reference to FIGS. 1-2, detailed descriptions of exemplary systems for performing fast failovers. Detailed descriptions of corresponding computer-implemented methods will also be provided in connection with FIG. 3. Detailed descriptions of an exemplary application will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing fast failovers. As illustrated in this figure, exemplary system 100 may include one or more modules 102 for performing one or more tasks. For example, and as will be explained in greater detail below, exemplary system 100 may include an identification module 104 programmed to identify an application to fail over from a first computing system to a second computing system. Exemplary system 100 may also include a dependency module 106 programmed to identify a first component of the application to fail over, the first component depending on a second component of the application and a third component of the application, the second component and third component being mutually independent.

In addition, and as will be described in greater detail below, exemplary system 100 may include a failover module 108 programmed to fail the application over from the first computing system to the second computing system by, based on a determination that the second component and third component are mutually independent, (1) taking the second component offline on the first computing system after taking the first component offline on the first computing system and (2) taking the third component offline on the first computing system while bringing the second component online on the second computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204 to fail over an application 210 to computing device 206.

In one embodiment, identification module 104, dependency module 106, and/or failover module 108 from FIG. 1 may, when executed by at least one processor of computing device 202, facilitate computing device 202 in performing fast failovers. For example, and as will be described in greater detail below, one or more of modules 102 may cause computing device 202 to 1) identify application 210 to fail over from computing device 202 to computing device 206, 2) identify a component 212 of application 210 to fail over, component 212 depending on a component 214 of application 210 and a component 216 of application 210, components 214 and 216 being mutually independent, and 3) fail application 210 over from computing device 202 to computing device 206 by, based on a determination that components 214 and 216 are mutually independent, (i) taking component 214 offline on computing device 202 after taking component 212 offline on computing device 202 and (ii) taking component 216 offline on computing device 202 while bringing component 214 online on computing device 206.

Computing device 202 generally represents any type or form of computing device capable of reading computer-executable instructions. Examples of computing device 202 include, without limitation, laptops, desktops, servers, virtual machines, cluster nodes, cellular phones, personal digital assistants (PDAs), multimedia players, embedded systems, combinations of one or more of the same, exemplary computing system 510 in FIG. 5, or any other suitable computing device.

Computing device 206 generally represents any type or form of computing device capable of reading computer-executable instructions. Examples of computing device 206 include, without limitation, laptops, desktops, tablets, servers, virtual machines, cluster nodes, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and computing device 206.

Figure 3:
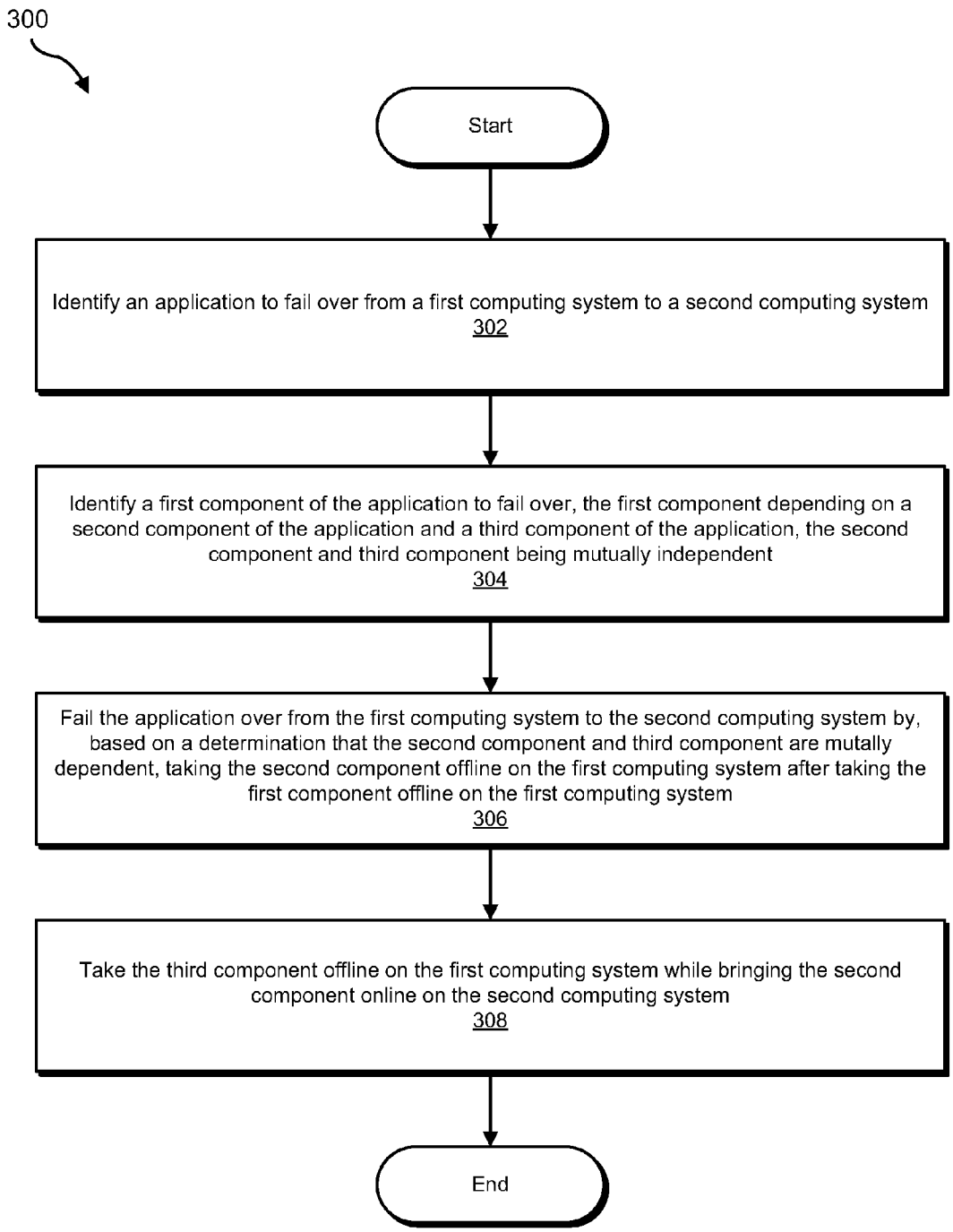
FIG. 3 is a flow diagram of an exemplary method for performing fast failovers.

FIG. 3 is a flow diagram of an exemplary computer-implemented method 300 for performing fast failovers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application to fail over from a first computing system to a second computing system. For example, at step 302 identification module 104 may, as part of computing device 202 in FIG. 2, identify application 210 to fail over from computing device 202 to computing device 206.

As used herein, the term "application" may refer to any application, program, and/or service. In some examples, the term "application" may refer to a collection of programs and/or modules that are and/or can be configured to provide a service when acting in concert.

As used herein, the term "failover" may generally refer to any procedure and/or process for using a new device as a host device for an application in lieu of an old device that formerly hosted the application. In some examples, a failover may provide a continuity of service to one or more client applications and/or devices. For example, a client that accessed an application on an old device may continue to access the application on a new device after a failover. In some examples, a failover may be triggered following a failure on a computing device. For example, identification module 104 may identify the application for failing over upon identifying a failure with the first computing system (e.g., an error that may interfere with the application), upon determining that the first computing system is overloaded (e.g., such that the application may not run correctly, reliably, and/or at a predetermined service level), and/or upon receiving an instruction from an administrator to fail the application over (e.g., in order to allow maintenance on the first computing system). In some examples, identification module 104 may identify the application for failing over in the context of a system migration—e.g., where data has finished replicating from the first computing system to the second computing system, and the second computing system is ready to host the application.

As used herein, the phrase "computing system" may refer to any system capable of independently executing and/or hosting an application. In some examples, the first and second computing systems may include one or more nodes in a computing cluster. Additionally or alternatively, the first and second computing systems may include virtual machines configured to host the application in a virtual environment.

Figure 4:
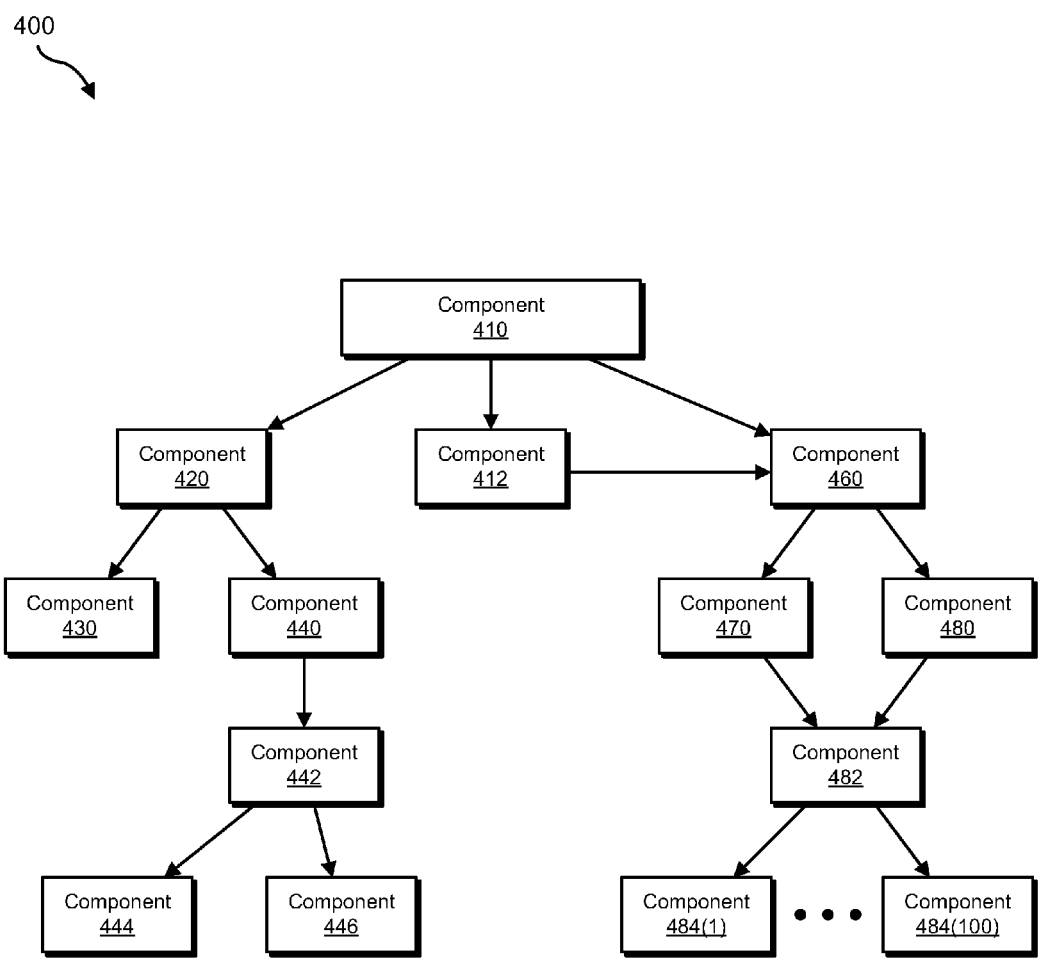
FIG. 4 is an illustration of an exemplary application with components and dependencies.

FIG. 4 illustrates an exemplary application 400. As shown in FIG. 4, application 400 may include various components with interdependencies. Using FIG. 4 as an example, at step 302 identification module 104 may identify application 400 as being subject to a failover.

Returning to FIG. 3, at step 304 one or more of the systems described herein may identify a first component of the application to fail over, the first component depending on a second component of the application and a third component of the application, the second component and third component being mutually independent. For example, at step 304 dependency module 106 may, as part of computing device 202 in FIG. 2, identify a component 212 of application 210 to fail over, component 212 depending on a component 214 of application 210 and a component 216 of application 210, components 214 and 216 being mutually independent.

As used herein, the term "component" may refer to any resource, module, service, and/or application that is included within and/or depended upon by an application and/or a component of an application. For example, the term "component" may refer to a device, a process, a physical resource, a virtual resource, a service group, a database, etc. For example, an application may include an operating system component as a component (e.g., a driver used by the application), a process as a component (e.g., for executing the application), a storage resource as a component (e.g., for storing application data), and a network resource as a component (e.g., for transmitting application data). In some examples, and as will be explained in greater detail below, the term "component" as used herein may refer to a plurality of subcomponents.

As used herein, the term "dependency" may refer to any relationship between two or more components characterized by one component depending on the operation of another component in order to operate correctly, reliably and/or efficiently. Additionally or alternatively, the term "dependency" may refer to any relationship between two or more components characterized by the lack of correct operation of one component causing one or more adverse effects (e.g., processing errors, data errors, host performance degradation, etc.) in a computing system where a dependent component is online. Accordingly, a failover system may be configured to take components with dependency relationships offline (and/or to bring them online) with certain ordering limitations to ensure that each component is online only when all components upon which it depends are online. Thus, as used herein the phrase "mutually independent" may refer to two or more components each of which are capable of operation irrespective of the status of the other.

Dependency module 106 may identify the first component in any of a variety of ways. For example, dependency module 106 may read from a configuration file and/or receive a message identifying the first component (e.g., in response to identifying the application for failover). In some examples, dependency module 106 may identify a first dependency relationship between the first component and the second component. Dependency module 106 may also identify a second dependency relationship between the first component and the third component. Accordingly, dependency module 106 may identify the first component in the context of identifying a plurality of components of the application. For example, dependency module 106 may identify a dependency graph describing dependencies between the plurality of components. As used herein, the term "dependency graph" may refer to any collection of data capable of describing one or more dependency relationships between one or more components.

Using FIG. 4 as an example, at step 304 dependency module 106 may identify component 410 and mutually independent components 412 and 420 upon which component 410 depends.

Returning to FIG. 3, at step 306 one or more of the systems described herein may fail the application over from the first computing system to the second computing system in part by, based on a determination that the second component and third component are mutually independent, taking the second component offline on the first computing system after taking the first component offline on the first computing system. For example, at step 306 failover module 108 may, as part of computing device 202 in FIG. 2, fail application 210 over from computing device 202 to computing device 206 in part by, based on a determination that components 214 and 216 are mutually independent, taking component 214 offline on computing device 202 after taking component 212 offline on computing device 202.

In some examples, failover module 108 may take the second component offline after taking the first component offline by starting to take the second component offline after the first component has released a handle on the second component such that the first component is no longer in a dependent state on the second component. Using FIG. 4 as an example, failover module 108 may first take component 410 offline. Failover module 108 may then take component 420 offline.

Returning to FIG. 3, at step 308 one or more of the systems described herein may fail the application over from the first computing system to the second computing system in part by, based on a determination that the second component and third component are mutually independent, taking the third component offline on the first computing system while bringing the second component online on the second computing system. For example, at step 308 failover module 108 may, as part of computing device 202 in FIG. 2, fail application 210 over from computing device 202 to computing device 206 in part by, based on a determination that components 214 and 216 are mutually independent, taking component 216 offline on computing device 202 while bringing component 214 online on computing device 206.

Failover module 108 may bring the second component online on the second computing system according to any suitable timing. For example, failover module 108 may start to bring the second component online on the second computing system before starting to take the third component offline on the first computing system. Additionally or alternatively, failover module 108 may start to bring the second component online on the second computing system while the third component is being taken offline on the first computing system.

In some examples, failover module 108 may take the first component offline on the first computing system before taking the second component offline on the first computing system. In these examples, failover module 108 may bring the first component online on the second computing system after bringing the third component online on the second computing system. In this manner, the second and third components may have been taken offline and/or brought back online in parallel before bringing the first component online on the second computing system.

As mentioned earlier, a component may include a plurality of subcomponents. For example, the second component may include a plurality of subcomponents. In this example, failover module 108 may take the third component offline by taking the third component offline on the first computing system while bringing at least one component within the plurality of subcomponents online on the second computing system. Using FIG. 4 as an example, the second component may include the subtree of components starting from component 420 (e.g., components 420, 430, 440, 442, 444, and 446) and the third component may include component 412. In this example, failover module 108 may take component 412 offline on the first computing system while bringing one or more of components 420, 430, 440, 442, 444, and 446 online on the second computing system. For example, failover module 108 may start taking down the subtree headed by component 420 by starting to take down component 430. Failover module 108 may then start taking down component 412. Component 412 may continue to prepare going offline, and failover module 108 may, in the meantime, bring down components 430, 440, 442, 444, and 446. Failover module 108 may then determine that since there are no interdependencies between the subtree of component 420 and component 412, failover module 108 may begin to bring the subtree of component 420 online (e.g., by bringing components 430, 444 and/or 446 online) before component 412 is offline.

In another example, the third component may include a plurality of components. In this example, failover module 108 may take the third component offline by taking at least one component within the plurality of subcomponents offline while bringing the second component online on the second computing system. Using FIG. 4 as an example, the second component may include the subtree of component 420 and the third component may include the subtree of component 460 (e.g., components 470, 480, 482, and 484(1)-(100)). Accordingly, failover module 108 may have completed taking the subtree of component 420 offline (e.g., by taking 430, 444, and 446 offline) before taking the subtree of component 460 offline. Accordingly, failover module 108 may still be taking one or more of components 484(1)-(100) offline while bringing the subtree of component 420 online.

As will be explained in greater detail below, by bringing components of an application back online on a target system during and/or before taking all independent components of the application offline on a failed system, the systems and methods described herein may facilitate faster failovers of applications and, thereby, potentially reduce application downtime after failure.

Figure 5:
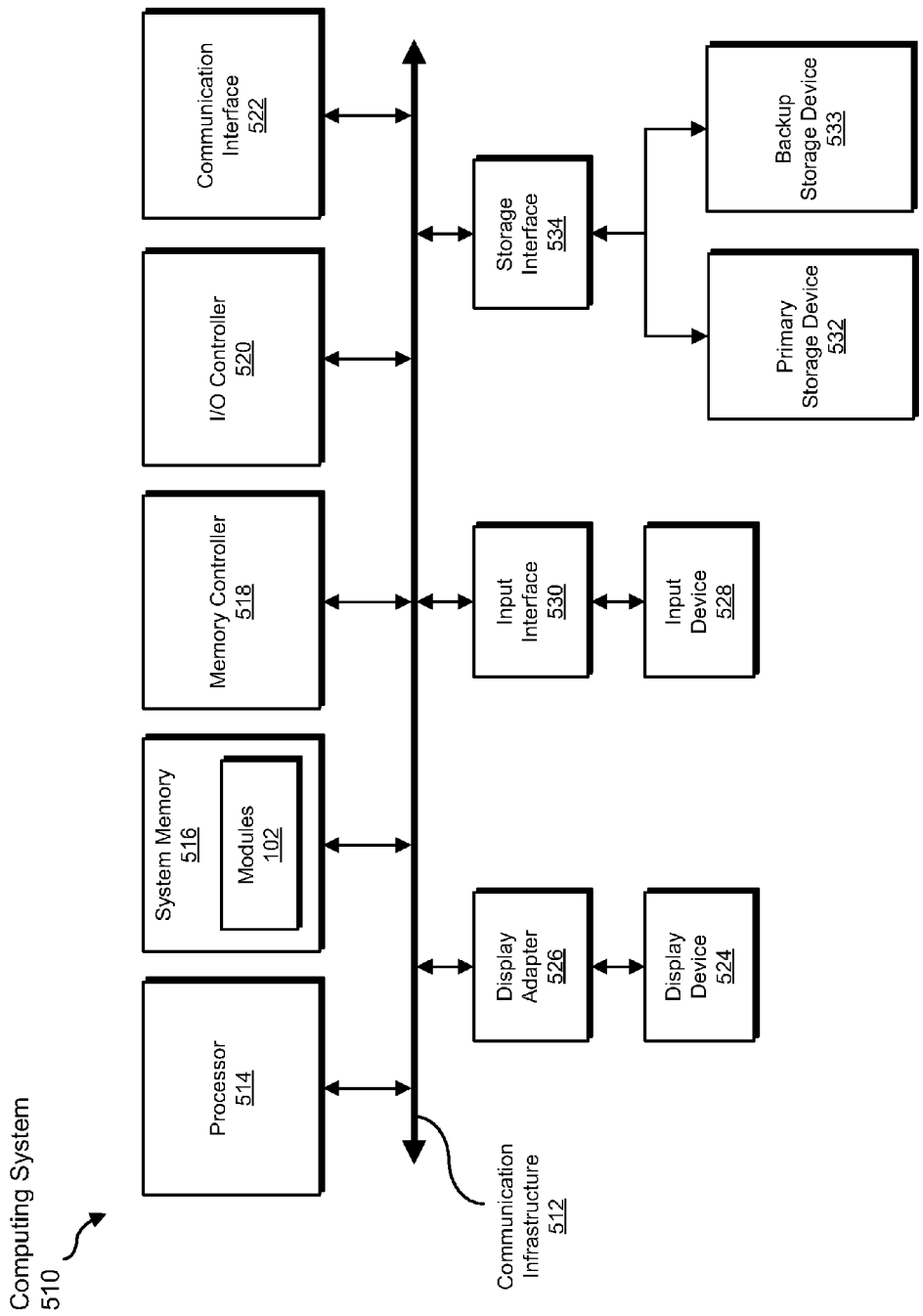
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, failing, taking, and bringing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
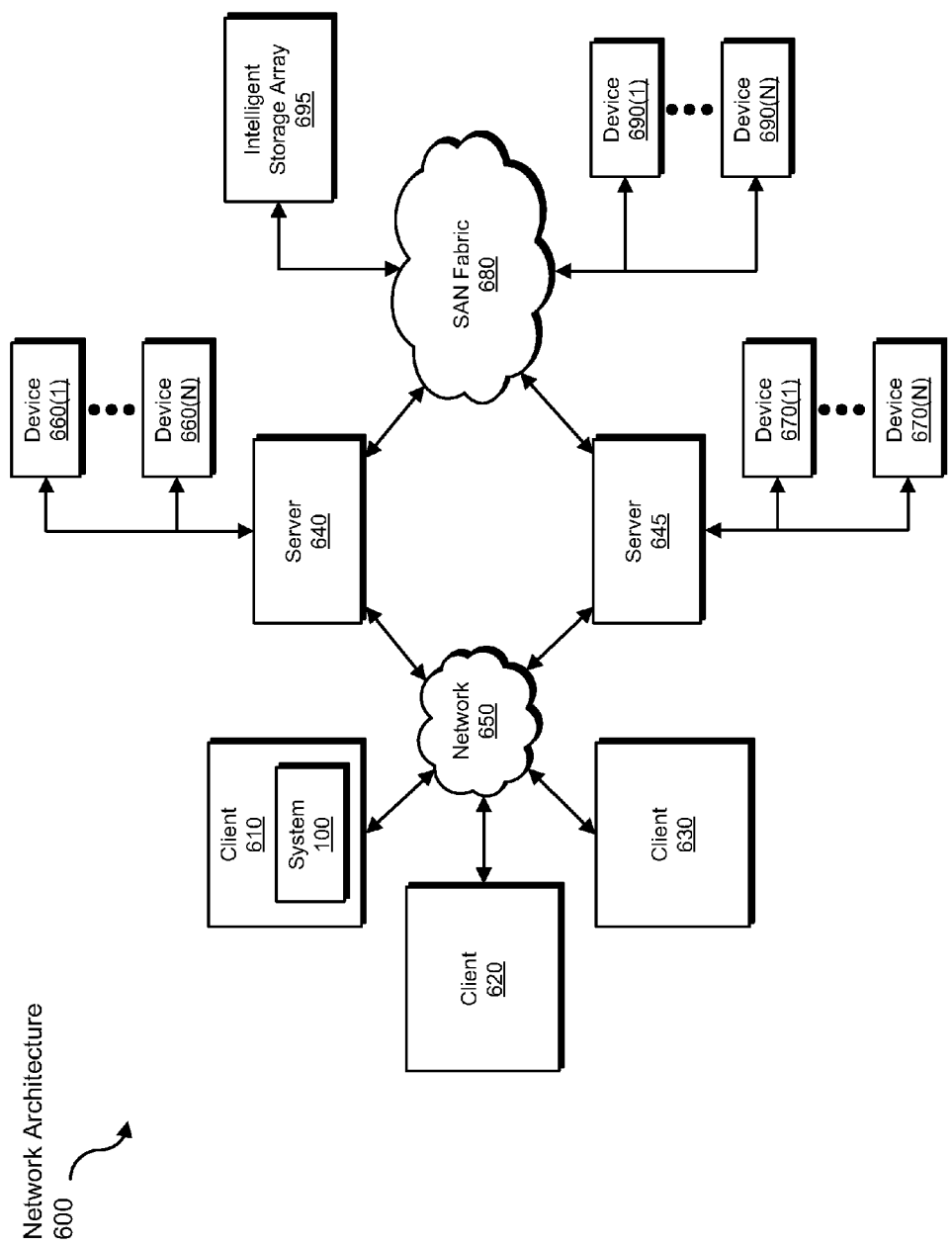
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, failing, taking, and bringing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing fast failovers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for performing fast failovers. As another example, one or more of the modules recited herein may transform a computing cluster into a cluster with higher availability for applications due to efficient failovers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing fast failovers, at least a portion of the method being performed by a computing device comprising at least one processor, the method comprising:
    identifying an application to fail over from a first computing system to a second computing system;
    identifying a first component of the application to fail over, the first component depending on a second component of the application and a third component of the application, the second component and third component being mutually independent;
    failing the application over from the first computing system to the second computing system by, based on a determination that the second component and third component are mutually independent:
        taking the first component offline on the first computing system before taking the second component offline on the first computing system;
        taking the second component offline on the first computing system after taking the first component offline on the first computing system;
        taking the third component offline on the first computing system while bringing the second component online on the second computing system;
        bringing the first component online on the second computing system after bringing the third component online on the second computing system.

2. The computer-implemented method of claim 1, wherein identifying the first component comprises:
    identifying a first dependency relationship between the first component and the second component;
    identifying a second dependency relationship between the first component and the third component.

3. The computer-implemented method of claim 1, wherein identifying the first component comprises identifying a plurality of components of the application.

4. The computer-implemented method of claim 3, wherein the plurality of components of the application comprises at least one of:
    an operating system component;
    a process;
    a network resource;
    a storage resource.

5. The computer-implemented method of claim 3, wherein identifying the plurality of components of the application comprises identifying a dependency graph describing dependencies between the plurality of components.

6. The computer-implemented method of claim 1, wherein:
    the second component comprises a plurality of subcomponents;
    taking the third component offline comprises taking the third component offline on the first computing system while bringing at least one component within the plurality of subcomponents online on the second computing system.

7. The computer-implemented method of claim 1, wherein:
    the third component comprises a plurality of subcomponents;
    taking the third component offline comprises taking at least one component within the plurality of subcomponents offline while bringing the second component online on the second computing system.

8. The computer-implemented method of claim 1, wherein taking the third component offline on the first computing system while bringing the second component online on the second computing system comprises starting to bring the second component online on the second computing system before starting to take the third component offline on the first computing system.

9. A system for performing fast failovers, the system comprising:
    an identification module programmed to identify an application to fail over from a first computing system to a second computing system;
    a dependency module programmed to identify a first component of the application to fail over, the first component depending on a second component of the application and a third component of the application, the second component and third component being mutually independent;
    a failover module programmed to fail the application over from the first computing system to the second computing system by, based on a determination that the second component and third component are mutually independent:

taking the first component offline on the first computing system before taking the second component offline on the first computing system;

taking the second component offline on the first computing system after taking the first component offline on the first computing system;

taking the third component offline on the first computing system while bringing the second component online on the second computing system;

bringing the first component online on the second computing system after bringing the third component online on the second computing system;

at least one processor configured to execute the identification module, the dependency module, and the failover module.

10. The system of claim 9, wherein the dependency module is programmed to identify the first component by:

identifying a first dependency relationship between the first component and the second component;

identifying a second dependency relationship between the first component and the third component.

11. The system of claim 9, wherein the dependency module is programmed to identify the first component by identifying a plurality of components of the application.

12. The system of claim 11, wherein the plurality of components of the application comprises at least one of:

an operating system component;

a process;

a network resource;

a storage resource.

13. The system of claim 11, wherein the dependency module is programmed to identify the plurality of components of the application by identifying a dependency graph describing dependencies between the plurality of components.

14. The system of claim 9, wherein:

the second component comprises a plurality of subcomponents;

the failover module is programmed to take the third component offline by taking the third component offline on the first computing system while bringing at least one component within the plurality of subcomponents online on the second computing system.

15. The system of claim 9, wherein:

the third component comprises a plurality of subcomponents;

the failover module is programmed to take the third component offline by taking at least one component within the plurality of subcomponents offline while bringing the second component online on the second computing system.

16. The system of claim 9, wherein the failover module is programmed to take the third component offline on the first computing system while bringing the second component online on the second computing system by starting to bring the second component online on the second computing system before starting to take the third component offline on the first computing system.

17. A non-transitory computer-readable-storage medium comprising one or more computer-executable instructions that, when executed by at least one processor of a computing device, cause the computing device to:

identify an application to fail over from a first computing system to a second computing system;

identify a first component of the application to fail over, the first component depending on a second component of the application and a third component of the application, the second component and third component being mutually independent;

fail the application over from the first computing system to the second computing system by, based on a determination that the second component and third component are mutually independent:

taking the first component offline on the first computing system before taking the second component offline on the first computing system;

taking the second component offline on the first computing system after taking the first component offline on the first computing system;

taking the third component offline on the first computing system while bringing the second component online on the second computing system;

bringing the first component online on the second computing system after bringing the third component online on the second computing system.

18. The computer-readable-storage medium of claim 17, wherein the one or more computer-executable instructions cause the computing device to identify the first component by causing the computing device to:

identify a first dependency relationship between the first component and the second component;

identify a second dependency relationship between the first component and the third component.

19. The computer-readable-storage medium of claim 17, wherein he one or more computer-executable instructions cause the computing device to identify the first component by causing the computing device to identify a plurality of components of the application.

20. The computer-readable-storage medium of claim 19, wherein the plurality of components of the application comprises at least one of:

an operating system component;

a process;

a network resource;

a storage resource.

* * * * *

UNITED STATES PATENT AND TRADEMARK OFFICE
CERTIFICATE OF CORRECTION

| | |
|---|---|
| PATENT NO. | : 8,938,639 B1 |
| APPLICATION NO. | : 13/404998 |
| DATED | : January 20, 2015 |
| INVENTOR(S) | : Soumya Tripathy, Mahendra Karmuse and Selvaraj M |

Page 1 of 1

It is certified that error appears in the above-identified patent and that said Letters Patent is hereby corrected as shown below:

In the Claims

Claim 19, at column 16, line 41, should read:

wherein the one or more computer-executable instructions

Signed and Sealed this
Fourteenth Day of July, 2015

Michelle K. Lee
*Director of the United States Patent and Trademark Office*